United States Patent
Clemente

(10) Patent No.: US 8,581,991 B1
(45) Date of Patent: *Nov. 12, 2013

(54) INTEGRATED INTERNET CAMERA SYSTEM AND METHOD

(71) Applicant: Alex Is the Best, LLC, Brooklyn, NY (US)

(72) Inventor: Frank Clemente, Brooklyn, NY (US)

(73) Assignee: Alex Is The Best, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,498

(22) Filed: Jun. 24, 2013

Related U.S. Application Data

(63) Continuation of application No. 13/415,346, filed on Mar. 8, 2012, now Pat. No. 8,477,197, which is a continuation of application No. 13/037,303, filed on Feb. 28, 2011, now Pat. No. 8,134,600, which is a continuation of application No. 12/637,277, filed on Dec. 14, 2009, now Pat. No. 7,907,172, which is a continuation of application No. 11/484,373, filed on Jul. 11, 2006, now Pat. No. 7,633,524.

(60) Provisional application No. 60/702,470, filed on Jul. 26, 2005.

(51) Int. Cl.
*H04N 5/225* (2006.01)
*H04N 7/14* (2006.01)
*H04N 7/173* (2011.01)
*G06F 15/16* (2006.01)

(52) U.S. Cl.
USPC .............. 348/207.1; 348/14.02; 725/105; 708/219

(58) Field of Classification Search
USPC .............. 348/207.1, 14.02; 725/105; 709/219
See application file for complete search history.

(56) References Cited

U.S. PATENT DOCUMENTS

| | | | |
|---|---|---|---|
| 5,027,150 | A | 6/1991 | Inoue et al. |
| 5,825,413 | A | 10/1998 | Mullis |
| 5,994,699 | A | 11/1999 | Akagawa |
| 6,239,833 | B1 | 5/2001 | Ozaki et al. |
| 6,567,122 | B1 | 5/2003 | Anderson et al. |
| 6,636,259 | B1 | 10/2003 | Anderson et al. |
| 6,658,091 | B1 | 12/2003 | Naidoo et al. |

(Continued)

FOREIGN PATENT DOCUMENTS

| | | |
|---|---|---|
| EP | 1 062 800 B1 | 4/2003 |
| WO | WO-95/35627 A1 | 12/1995 |
| WO | WO-01/27787 A1 | 4/2001 |
| WO | WO-2004/015951 A1 | 2/2004 |

*Primary Examiner* — James Hannett
*Assistant Examiner* — Quang Le
(74) *Attorney, Agent, or Firm* — IM IP Law PLLC; C. Andrew Im

(57) ABSTRACT

An integrated Internet camera system method comprises a website archive and review center (WSARC) for storing and managing images and an Internet direct device for capturing an image, automatically transmitting the image to an account associated with the Internet direct device on the WSARC upon image capture and receiving stored image from the WSARC. The Internet direct device comprises an imaging system, a microprocessor and a display for displaying the captured image and the received image. The Internet direct device automatically connects to the communication network on power-up. The Internet direct device automatically switches to another available mode of connection when the Internet direct device detects that the primary mode of connection to the communications network is unavailable.

40 Claims, 2 Drawing Sheets

(56) References Cited

U.S. PATENT DOCUMENTS

| | | |
|---|---|---|
| 6,744,467 B2 | 6/2004 | Thompson et al. |
| 6,763,226 B1 | 7/2004 | McZeal, Jr. |
| 6,882,326 B2 | 4/2005 | Hirayama et al. |
| 6,930,709 B1 * | 8/2005 | Creamer et al. ............ 348/211.3 |
| 6,980,232 B2 * | 12/2005 | Suzuki ....................... 348/207.1 |
| 7,272,641 B2 * | 9/2007 | Yamagishi .................... 709/218 |
| 7,333,785 B1 | 2/2008 | Lavelle et al. |
| 7,395,056 B2 * | 7/2008 | Petermann ................. 455/422.1 |
| 2001/0005840 A1 | 6/2001 | Verkama |
| 2001/0017655 A1 | 8/2001 | Arakt |
| 2001/0024232 A1 | 9/2001 | Suzuki |
| 2002/0013815 A1 | 1/2002 | Obradovich et al. |
| 2002/0053087 A1 | 5/2002 | Negishi et al. |
| 2002/0143769 A1 | 10/2002 | Tecu et al. |
| 2002/0164945 A1 | 11/2002 | Olsen et al. |
| 2003/0020811 A1 | 1/2003 | Hunter et al. |
| 2003/0227540 A1 | 12/2003 | Monroe |
| 2004/0070670 A1 | 4/2004 | Foster |
| 2004/0109063 A1 | 6/2004 | Kusaka et al. |
| 2004/0152440 A1 | 8/2004 | Yoda et al. |
| 2004/0169759 A1 | 9/2004 | Kikuchi |
| 2004/0250288 A1 | 12/2004 | Palmerio |
| 2005/0014493 A1 | 1/2005 | Ford |
| 2005/0055727 A1 | 3/2005 | Creamer et al. |
| 2005/0057649 A1 | 3/2005 | Marks |
| 2005/0078189 A1 | 4/2005 | Creamer et al. |
| 2005/0096034 A1 | 5/2005 | Petermann |
| 2005/0099519 A1 | 5/2005 | Creamer et al. |
| 2005/0102167 A1 | 5/2005 | Kapoor |
| 2005/0130611 A1 | 6/2005 | Lu et al. |
| 2005/0144653 A1 | 6/2005 | Creamer et al. |
| 2005/0146609 A1 | 7/2005 | Creamer et al. |
| 2005/0146610 A1 | 7/2005 | Creamer et al. |
| 2005/0146621 A1 | 7/2005 | Tanaka et al. |
| 2005/0149979 A1 | 7/2005 | Creamer et al. |
| 2005/0213147 A1 | 9/2005 | Minatogawa |
| 2006/0150211 A1 | 7/2006 | Ritter |
| 2006/0161960 A1 | 7/2006 | Benoit |
| 2006/0290326 A1 | 12/2006 | Bhesania et al. |

* cited by examiner

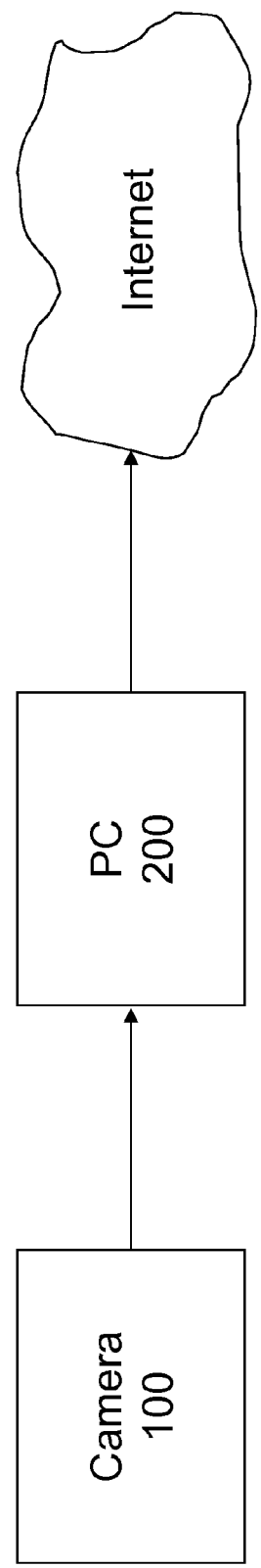

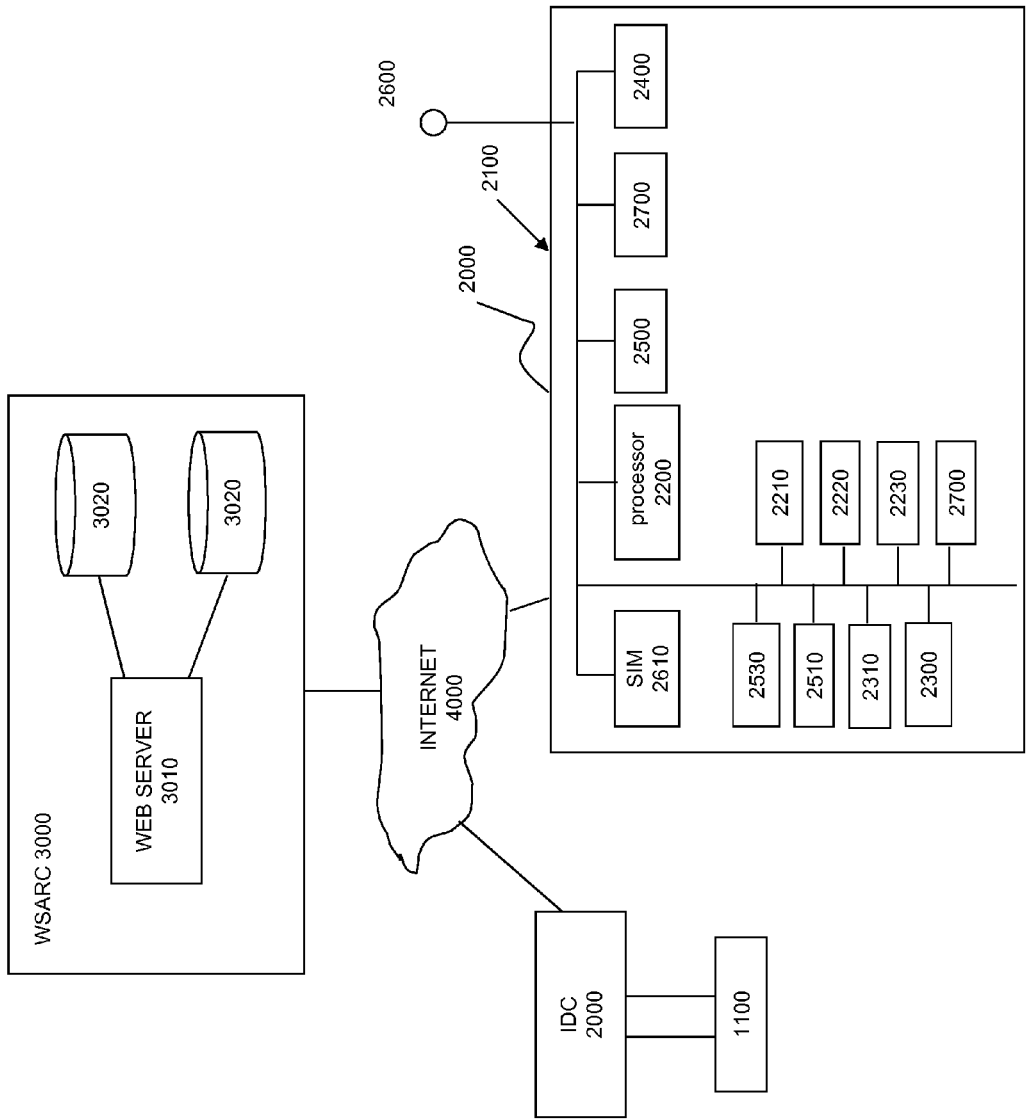

INTEGRATED INTERNET CAMERA SYSTEM AND METHOD

RELATED APPLICATION

The present application is a continuation of application Ser. No. 13/415,346 filed Mar. 8, 2012, which is a continuation of application Ser. No. 13/037,303 filed Feb. 28, 2011, now U.S. Pat. No. 8,134,600, which is a continuation of application Ser. No. 12/637,277 filed Dec. 14, 2009, now U.S. Pat. No. 7,907,172, which is a continuation of application Ser. No. 11/484,373 filed Jul. 11, 2006, now U.S. Pat. No. 7,633,524, which claims a priority to U.S. Provisional Patent Application Ser. No. 60/702,470, each of which is incorporated herein by reference in its entirety.

FIELD OF THE INVENTION

The present invention relates to an integrated Internet camera and/or system that is simple to install, operate and maintain, more particularly to an integrated Internet camera and/or video system that seamlessly and automatically transmits, receives, stores and/or archives still images, video and/or audio to and from a web site service/monitor center over the Internet using one or more integrated Internet cameras.

BACKGROUND OF THE INVENTION

The increasing use and awareness of the utility afforded by the Internet has transformed this simple image recording or capture process into a more complicated process requiring permanent storage and providing a secure centralized access to such storage from any remote location.

The currently available camera systems available are rigid and expensive. These systems are complex and require a host of peripheral devices to place an image on the Internet or Web. Additionally, these systems are bulky and not very portable. Moreover, the user must install one or more software to operate such camera systems. In a security monitoring application, these camera systems require a qualified operator to operate and maintain such system.

An example of such prior camera system is shown in FIG. 1. In order for an operator to transfer the still image, video and/or audio file from a video camera 100 to an account on the Internet or Web, the operator must connect the video camera 100 to a personal computer PC 200. The still image, video and/or audio file is transferred and stored in the PC 200 before it is transferred or uploaded onto the Internet. That is, the camera 100 must be connected to a network device (e.g., PC 200) before it can transmit or receive still image, video or audio files.

Some have attempted to resolve this problem by purchasing a network card (wired or wireless) to enable their camera 100 to connect to the Internet without a separate network device (i.e., PC 200). However, such solution is only available if the camera 100 can accept such network card and does not provide two-way access to the image file, i.e., transmitting to storage and receiving from storage. Additionally, such solution generally requires the operator to install the network card and accompanying software to "network" enabled camera 100.

Therefore, it is desirable to have an integrated Internet camera system that can seamlessly upload and download video and/or audio files to and from the Internet, transmits these files to another web-enabled portable device (e.g., another camera, a personal digital assistant (PDA), a cell phone and the like), receive/download video and/or audio files from another portable device and/or store/archive these files in a secure website without the necessity of connecting to another device, such as a PC 200.

OBJECTS AND SUMMARY OF THE INVENTION

There are many commercial and general consumer needs for this integrated Internet camera system. Some examples are in the fields of security, engineering, entertainment, advertising, child care monitoring and personal use, such as for family social occasions.

Accordingly, it is an object of the present invention to provide an integrated Internet camera system ("IICS") that allows even the novice users to seamlessly link their Internet direct cameras ("IDC") to a dedicated website of the IICS operator (such as a website archive and review center ("WSARC") to begin recording/storing/archiving of the images on the WSARC by simply powering their IDC. The present invention's ease of use, less working parts, lower maintenances, lower expenses, and easily accessible support enables the novice users to quickly employ and enjoy the IICS of the present invention. Additionally, the IICS is very flexible, it can be easily expanded and customized to provide a host of services and meet various needs of both personal and commercial users.

It is another object of the present invention to provide the IICS as aforesaid, which comprises IDC that can automatically and seamlessly connect to the WSARC by simply powering on the IDC. That is, when an operator takes a picture, the IDC automatically transmits the image to the WSARC.

Accordingly, it is an object of the present invention to provide an inexpensive and efficient camera having all necessary functionality for transmission and reception of real-time, stored and archived digital images to and from the Internet in a single, portable standalone apparatus (i.e., an embedded system), without requiring the use of an external controlling apparatus such as a personal computer.

Another object of the present invention is to provide a WSARC that enables an authorized user to schedule transmission of digital images to one or more IDC(s) upon receipt of an image from an IDC associated with that authorized user.

A further of the present invention is to provide a portable, standalone camera that initiates transmission of digital images to the Internet, i.e., WSARC, upon an image capture.

In accordance with an embodiment of the present invention, an integrated Internet camera system for transmitting digital images to an Internet address comprises an image pickup, an optical module for forming an image on the image pickup, and an image capturing module for capturing digital images from the image pickup. A wireless device or SIMMS card connects and maintains the IDC's connection to the Internet for transmission of the digital image files to a user account associated with the IDC at a predetermined Internet address (i.e., WSARC) and transfers the digital image files to the user account. The digital image files in the user account are then available to authorized users of the account. Depending on the access privilege such authorized user may access the entire or a portion of the stored/archived digital image files.

In accordance with an embodiment of the present invention, an integrated Internet camera system comprises a website archive and review center (WSARC) for storing, archiving and managing images and an Internet direct camera (IDC) for capturing an image, automatically transmitting the image to an account associated with said IDC on the WSARC upon image capture and receiving stored/archived image from the WSARC. The IDC comprises a display for displaying the captured image and the received image. The IDC automatically connects to the WSARC over an Internet connection on power-up.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein:

FIG. 1 shows a conventional stationary camera which captures and transmits images to the Internet using a local PC; and FIG. 2 illustrates an Integrated Internet camera system in accordance with an exemplary embodiment of the present invention.

DETAILED DESCRIPTION OF THE EMBODIMENTS

Turning now to FIG. 2, there is illustrated an integrated Internet camera system (IICS) 1000 in accordance with an embodiment of the present invention comprising a plurality Internet direct cameras (IDCs) 2000 connected to a website archive and storage center (WSARC) 3000 over the Internet 4000. The WSARC 3000 comprises a web server 3010 and one or more database 3020 to store and/or archive images received from the IDCs 2000. The IICS 1000 uses the IDC 2000 (preferably a multi-mode camera) to transmit a still image, video and audio (collectively referred to herein as the "data"), onto the Internet 4000 via a multi mode Internet Access Antenna (IAA) 2600 to a monitored WSARC 3000. The IDC 2000 can connect to the Internet via, but not limited to, land line, DSL, cable, satellite, wireless network, cellular, Wi-Fi, Wi-Max and the like. Preferably, the IDC 2000 connects to the Internet via a primary mode of communication and switches over the secondary mode of communication if the IDC 2000 detects a failure in the primary mode of communication. For example, if the IDC 2000 is programmed or setup to use Wi-Fi as a primary mode of communication, the IDC 2000 can switch to a cellular communication if the Wi-Fi communication is lost or unavailable.

In accordance with an exemplary embodiment of the present invention, the IDC 2000 comprises an embedded address, a subscriber identification module (SIM) card 2610 or other comparable device or means to enable the IDC's connection to the WSARC 3000 to be embedded, preset, encrypted, proprietary and firewall protected. If the IDC 2000 is faulty or inoperable, the user can simply remove its SIM card 2610 and install it in the new IDC 2000. That is, the SIM card 2610 is interchangeable from one IDC 2000 to another IDC 2000.

In accordance with an exemplary embodiment of the present invention, the IDC 2000 comprises a microcontroller or microprocessor 2200 for controlling the various components of the IDC 2000, a display 2300, preferably LCD display, to display captured images, an image-forming optical system 2500 for capturing images, a compression module 2210 for compressing captured images, a storage device 2400 for storing and/or archiving capture images, an image adjusting module 2220 for performing image processing on a stored/archived digital image and a text module 2230 for superimposing text information on a stored/archived digital image. In accordance with an embodiment of the present invention, the microcontroller 2200 controls the compression module 2210 to perform image compression, e.g., JPEG, Huffman, wavelet and the like and outputs images in JPEG, TIFF, GIFF and other known formats for storage in the storage device 2400 and/or transmission to the WSARC 3000. The microcontroller 2200 also can control the image adjusting module 2220 to adjust the resolution of image stored/archived in the storage device 2400 on a continuous scale with preferred preservation of aspect ratio either before or after storage therein or before or after transmission to the WSARC 3000.

All of the electronic, mechanical, optical and display components of the IDC 2000 are housed within a camera body 2100. A viewfinder 2530 allows the operator to view a scene corresponding to, or identical to, an image formed on an image pickup 2510 of the IDC 2000 via the image-forming optical system 2500. The image-forming optical system 2500 can comprises a zoom lens or an auto-focus system.

The display 2300 displays the results of user interaction, status reporting to the user and images/vides captured or received by the IDC 2000. The storage device 2400 can be a memory, a hard drive, a DRAM, a NAND, a flash memory, a memory stick, a storage disk and the like. It is appreciated that IDC 2000 without the storage device 2400 has the benefit of lowering the cost of the IDC 2000. The storage device 2400 advantageously enables the user to continue recording even if the Internet connection is temporarily lost or unavailable.

Instead of the viewfinder 2530, the IDC 2000 in accordance with an embodiment of the present invention utilizes a detachable or integrated full video (LCD) display 2300. Accordingly, the display 2300 is a color or grayscale (video) LCD, and the microcontroller 2200 drives the display 2300 to show images formed on the image pickup 2510.

In accordance with an exemplary embodiment of the present invention, the storage device 2400 records the data constantly, preferably with a chosen time frame override. In accordance with an aspect of the present invention, the IDC 2000 transmits the data to the WSARC 3000 and simultaneously records the data on the storage device 2400.

In accordance with an exemplary embodiment of the present invention, the IDC 2000 comprises a meter that shows amount of time or data remaining to be transmitted to the WSARC 3000.

In accordance with an exemplary embodiment of the present invention, the storage device 1120 records the data when the Internet connection is lost. The IDC 2000 transmits the stored/archived data when the Internet connection to the WSARC 3000 is re-established. Preferably, the storage device 2400 records the data until all recorded data is sent to the WSARC 3000 over the Internet 4000 and then move seamlessly to transmitting live data without loss of data.

In accordance with an exemplary embodiment of the present invention, the storage device 1120 records the data where Internet access is unavailable, such as a factory or a remote site. Periodically, the IDC 2000 can be moved to a site where Internet access is available and the recordings can be transmitted to the WSARC 3000. In accordance with an embodiment of the present invention, the IDC 2000 can be replaced with another IDC 2000 so the recording is continuous. Preferably, the storage device 2400 is removable such that the storage device 2400 is periodically replaced with a new one so that the recording is continuous. The recordings on the removed IDC 2000 and/or the storage device 1120 are then transferred to the WSARC 3000.

In accordance with an exemplary embodiment of the present invention, the IDC 2000 comprises a light indicator, such as an LED 2310, indicating whether the IDC 2000 is connected to the Internet (i.e., the WSARC 3000). The LED 2310 is "green" to indicate that the IDC 2000 is connected to the WSARC 3000 and "red" to indicate that the IDC 2000 is not connected to the WSARC 3000. This will advantageously enable the user or operator of the IDC 2000 to know the status of the Internet connection immediately. In accordance with an aspect of the present invention, if the WSARC 3000 loses connection to an IDC 2000, the WSARC 3000 sends an email to a predetermined address or places a phone call to a predetermined number (or other comparable notification means) designated by the registered user of the IDC 2000.

In accordance with an exemplary embodiment of the present invention, the IDC 2000 comprises a motion sensor 2700 for activating the recording only when the motion sensor 2700 detects motion. For example, this can be useful for monitoring remote, unpopulated locations, such as a warehouse or a factory in off-hour or a summer or winter home in off-season, for any unauthorized intrusion. Preferably, the IDC 2000 only records when the motion sensor 2700 detects an activity or motion within a monitoring area or site. In accordance with an aspect of the present invention, upon activation of the IDC 2000, the WSARC 3000 can be setup or program to send an email to a predetermined address or place a phone call to a predetermined number (or other comparable notification means), which can be designated by the registered user of the IDC 2000.

In accordance with an exemplary embodiment of the present invention, the IDC 2000 can be placed or mounted on a mounting device 1100 which can rotate or pivot the IDC 2000, thereby enabling the operator to remotely control the IDC 2000 via the WSARC 3000. As noted herein, for example, when the registered user receives an email or a phone call that the IDC 2000 has detected an activity within a warehouse, the registered user can log onto the WSARC 3000 and remotely operate one or more IDCs 2000 within the warehouse to determine the cause of this activity. Alternatively, an operator associated with the WSARC 3000 can remotely operate one or more IDCs 2000 within the warehouse to determine the cause of this activity. Such remote monitoring capability with the IICS 1000 enables the operator of the WSARC 3000 or the registered user to quickly determine if the activity is a false alarm or real intrusion that needs to be dealt with and reported to the local police authority.

In accordance with an exemplary embodiment of the present invention, the WSARC 3000 is staffed with operators, technicians, security personnel and the like to provide a full monitoring service, such as 24/7 (24 hours/7 days a week) monitoring service. If the operator of the WSARC 3000 determines if there is an incident or event warranting a investigation within a remote monitoring site, such as a home, office, warehouse, etc., the operator can dispatch a security personnel to investigate the incident.

In accordance with an exemplary embodiment of the present invention, the IDC 2000 comprises a battery 2800, which provides power to all of the components of the IDC 2000. It is appreciated that IDC 2000 can be powered by any variety of power sources. The IDC 2000 can be powered exclusively by the internal battery 2800 or by other power sources, such as solar power or AC power with the internal battery 2800 serving as a backup power source. Preferably, the internal battery 2800 is a rechargeable battery that can be recharged by solar or electrical power. The rechargeable battery can incorporate an AC adapter, preferably provided outside the IDC 2000 in order to reduce the size of the camera. The AC adapter plugs into a conventional AC outlet, and can be a "Universal" AC adapter connectible to various worldwide AC supplies. In accordance with an embodiment of the present invention, the IDC 2000 can be setup or programmed to alert the WSARC 3000 to send an email to a predetermined address or place a call to predetermined number (or other comparable notification means) when the IDC 2000 determines the power of the battery 2800 is below a predetermined threshold. Additionally, the WSARC 3000 automatically sends an email to a predetermined address or place a call to a predetermined number (or other comparable notification means) when the WSARC 3000 is unavailable to communicate with WSARC 3000 for any reason, such as loss of power, loss of Internet connection, etc. This advantageously alerts the registered user of the IDC 2000 to replace the IDC's battery 2800.

In accordance with an exemplary embodiment of the present invention, the IDC 2000 can be used as a cell phone employing voice over IP (VOIP) via the Internet connection or traditional cellular network for voice communication and/or data transmission, such as text messages. Additionally, the IDC 2000 can use the Internet connection to download live or recorded audio and/or video content from the Internet. The necessary hardware and software components can reside within the IDC 2000 or in a separate device removable attachable to the IDC 2000.

In accordance with an exemplary embodiment of the present invention, the IICS 1000 is deployed in a warehouse with 10 IDCs 2000. The registered user or an operator of the WSARC 3000 can view all ten IDCs 2000 individually, together or in a group. It is appreciated that more IDCs 2000 can be added or distributed over multiple warehouses or buildings.

In accordance with an exemplary embodiment of the present invention, the image pickup 2510 of the IDC 2000 can be infrared or UV light sensor suitable for recording or generating infrared or UV images. Preferably, the IDC 2000 comprises a scope-shaped attachment the can provide specialized lighting and/or scope-shaped magnified zoom lens to provide specialized viewing. For example, this enables the IDC 2000 to record fine cracks and crevices in machinery and/or building. The infrared light capability advantageously permits the IICS 1000 to operate in low light to monitor building or warehouse at night.

In accordance with an exemplary embodiment of the present invention, the WSARC 3000 is accessible by registered users and users authorized by registered users using their login name and password. The registered user can give other users access or viewing rights to certain files, folders, etc. on a permanent or temporary basis. That is, the user's ability to view recordings or data stored/archived in the WSARC 3000 will be dictated by the rights assigned to the user. The grouping and granting of certain viewing rights can be pre-set by the registered user or owner of the account. In accordance with an exemplary embodiment of the present invention, the WSARC 3000 can provide temporary access based on certain preference or fee. For example, to help cover the cost of recording Little League baseball games, a registered user can establish an account so parents, grandparents and friends of the players can access and download the recordings of the games for a fee. The fee can be one-time fee (i.e., for the entire season), per game, per access, etc.

It is appreciated that WSARC 3000 comprises standard known tools to enable the registered user can organize their images. In accordance with an exemplary embodiment of the present invention, the registered user can organize the images by location, e.g., warehouse, home, country house, etc., using a file folder hierarchy structure. When a user clicks on one of the displayed location, the WSARC 3000 displays another menu listing the groups within that location. For example, when a user clicks the location labeled "warehouse," the WSARC 3000 can list the following groups: office, garage, interior warehouse, outside perimeter, parking lot, etc. When a user clicks the location labeled "home," the WSARC 3000 can list the following groups: 1$^{st}$ floor, 2$^{nd}$ floor, living room, dining room, kitchen, garage, bedroom 1, bedroom 2, basement, outside perimeter, etc.

In accordance with an exemplary embodiment of the present invention, the WSARC 3000 can archive the recordings by date (such as year), name, or by event titled by the registered user. That is, the registered user can name or rename the recordings. This advantageously enables the user to search the archive by date, name or event. The registered user can label the events such as weddings, birthdays, anniversaries, etc. When a user clicks on an event labeled "birthdays," the WSARC 3000 displays a list of all of titles named "birthday," for example:

Rita Marie's 1$^{st}$ Birthday
Rita Marie's 16$^{th}$ Birthday
Frankie's 1$^{st}$ Birthday
Mommy's 30$^{th}$ Birthday
Grandma's 70$^{th}$ Birthday It is appreciated that these events is also searchable by date and name. These events would be available to search by date and by group name. Whichever method is easier for the user to find, this all depends on the detail of label a given user employs.

In accordance with an exemplary embodiment of the present invention, the text module 2230 enables the registered user to type over the images before the images are transmitted to the WSARC 3000. Preferably, the LCD display 2300 comprises a touch keypad for entering text and labeling the image before it is transmitted to the WSARC 3000.

In accordance with an exemplary embodiment of the present invention, the IDC 2000 comprises a plug-in, e.g., USB port, for a microphone or headphones, to enable to the user to record voice over the live or recorded images. Alternatively, the WSARC 3000 comprises tools to enable the registered user to edit the recorded images to record voice over the stored/archived images to clarify, comment or explain the recorded images.

In accordance with an exemplary embodiment of the embodiment of the present invention, each account at WSARC 3000 can be assigned to one or more registered users, thereby permitting each registered user of the account to seamlessly transmit and receive images from the other registered user. For example, the parents are vacationing in Europe, the grandparents live in Brazil, Rita Marie is skiing in New Zealand and Frankie is diving in Hawaii. The IICS 1000 of the present invention enables the parents to seamlessly receive images from and transmit images to their daughter in New Zealand, the grandparents in Brazil and their son in Hawaii.

In accordance with an exemplary embodiment of the present invention, the IDC 2000 comprises a web browser linked to the Internet 4000. The registered user can use the IDC 2000 to retrieve or view stored/archived images in its account on the WSARC 3000, manage its WSARC account, send/receive emails via an email account established on the WSARC 3000 or surf the Internet.

In accordance with an exemplary embodiment of the present invention, the registered user can access the WSARC 3000 using the IDC 2000 or a standard computer to retrieve, view stored/archived images, email stored/archived images or download stored/archived images onto a CD, DVD and the like.

The IDC 2000 of the present invention comprises all of the standard known components to capture digital images, make a connection to the Internet, and transmit images over the Internet. This advantageously enables the IDC 2000 to be used in many applications, such as in entertainment, advertising, education, security, traffic monitoring, weather monitoring, child care monitoring, surveillance, and general consumer applications.

Although the above description sets forth particular embodiments of the present invention, modifications of the invention will be readily apparent to those skilled in the art, and it is intended that the scope of the invention be determined solely by the appended claims.

What is claimed is:

1. A method for transmitting and receiving still or video images by an Internet direct device associated with a user over a communications network, comprising the steps of:
automatically connecting the Internet direct device to said communications network on power-up using one of a plurality of available modes of connection, which is designated as a primary mode of connection;
capturing still or video images by an image capture system of the Internet direct device;
transmitting the captured still or video images to an account associated with the Internet direct device on a website archive and review (WSARC) upon image capture by a microprocessor of the Internet direct device;
receiving still or video images from said WSARC over the communications network by the Internet direct device; and
automatically switching to another available mode of connection by the microprocessor when the Internet direct device detects that said primary mode of connection to the communications network is unavailable.

2. The method of claim 1, wherein the step of automatically switching comprises the step of switching to one of the following available modes of connection: a land line, DSL, cable, satellite, wireless network, cellular, Wi-Fi, and Wi-Max.

3. The method of claim 1, further comprising the steps of locally storing the captured still or video images in a storage device of the Internet direct device by the microprocessor when the connection to said communications network is unavailable, and transmitting the stored still or video images to said WSARC by the microprocessor when the connection to said communications network is re-established.

4. The method of claim 1, further comprising the step of selecting another available mode of connection as the primary mode of connection.

5. The method of claim 1, further comprising the step of communicating with other Internet direct devices by the Internet direct device associated with the user over said communications network.

6. The method of claim 5, further comprising the step of communicating with other Internet direct devices via voice over IP by the Internet direct device associated with the user.

7. The method of claim 5, further comprising the step transmitting and receiving still or video images to and from said other Internet direct devices by the microprocessor of the Internet direct device associated with the user over said communications network.

8. The method of claim 5, further comprising the step of transmitting and receiving audio to and from said other Internet direct devices by the microprocessor of the Internet direct device associated with the user over said communications network.

9. The method of claim 1, further comprising the steps of displaying the still or video images on a display of the Internet direct device, and receiving texts from the user by the Internet direct device.

10. The method of claim 1, further comprising the step of accessing the Internet using a web browser of the Internet direct device over said communications network.

11. The method of claim 10, further comprising the step of downloading live or recorded audio or video images from a website by the microprocessor of the Internet direct device over said communications network.

12. The method of claim 1, further comprising the step of compressing the captured still or video images.

13. A non-transitory storage medium comprising a program for transmitting and receiving still or video images over a communications network when executed by an Internet direct device associated with a user to cause the Internet direct device to:
   automatically connect to said communications network on power-up using one of a plurality of available modes of connection, which is designated as a primary mode of connection;
   capture still or video images by an image capture system of the Internet direct device;
   transmit said captured still or video images to an account associated with the Internet direct device on a website archive and review (WSARC) upon image capture by a microprocessor of the Internet direct device;
   receive still or video images from said WSARC over the communications network; and
   automatically switch to another available mode of connection by the microprocessor when the Internet direct device detects that said primary mode of connection to the communications network is unavailable.

14. The storage medium of claim 13, the program when executed causes the Internet direct device to locally store the captured still or video images in a storage device when the connection to said communications network is unavailable, and transmits the stored still or video images to said WSARC when the connection to said communications network is re-established.

15. The storage medium of claim 13, the program when executed causes the Internet direct device to communicate with other Internet direct devices over said communications network.

16. The storage medium of claim 15, the program when executed causes the Internet direct device to communicate with other Internet direct devices via voice over IP.

17. The storage medium of claim 15, the program when executed causes the Internet direct device to transmit and receive still or video images to and from said other Internet direct devices over said communications network.

18. The storage medium of claim 15, the program when executed causes the Internet direct device to transmit and receive audio to and from said other Internet direct devices over said communications network.

19. The storage medium of claim 13, the program when executed causes the Internet direct device to access the Internet using a web browser over said communications network.

20. The storage medium of claim 19, the program when executed causes the Internet direct device to download live or recorded audio or video images from a website over said communications network.

21. The storage medium of claim 13, the program when executed causes the Internet direct device to compress the captured still or video images.

22. A method for transmitting and receiving still or video images by an Internet direct device associated with a user over a communications network, comprising the steps of:
   automatically connecting the Internet direct device to said communications network on power-up using one of a plurality of available modes of connection, which is designated as a primary mode of connection;
   capturing still or video images by an image capture system of the Internet direct device;
   transmitting the captured still or video images to another Internet direct device over said communications network upon image capture by a microprocessor of the Internet direct device;
   receiving still or video images from said other Internet direct device over said communications network by the Internet direct device; and
   automatically switching to another available mode of connection by the microprocessor when the Internet direct device detects that said primary mode of connection to the communications network is unavailable.

23. The method of claim 22, wherein the step of automatically switching comprises the step of switching to one of the following available modes of connection: a land line, DSL, cable, satellite, wireless network, cellular, Wi-Fi, and Wi-Max.

24. The method of claim 22, further comprising the steps of locally storing the captured still or video images in a storage device of the Internet direct device by the microprocessor when the connection to said communications network is unavailable.

25. The method of claim 22, further comprising the step of transmitting and receiving audio to and from said other Internet direct devices by the microprocessor of the Internet direct device associated with the user over said communications network.

26. The method of claim 22, further comprising the step of selecting another available mode of connection as the primary mode of connection.

27. The method of claim 22, further comprising the step of communicating with other Internet direct devices by the Internet direct device associated with the user over said communications network.

28. The method of claim 22, further comprising the step of communicate with other Internet direct devices via voice over IP by the Internet direct device associated with the user.

29. The method of claim 22, further comprising the steps of displaying the still or video images on a display of the Internet direct device, and receiving texts from the user by the Internet direct device.

30. The method of claim 22, further comprising the step of accessing the Internet using a web browser of the Internet direct device over said communications network.

31. The method of claim 30, further comprising the step of downloading live or recorded audio or video images from a website by the microprocessor of the Internet direct device over said communications network.

32. A non-transitory storage medium comprising a program for transmitting and receiving still or video images over a communications network when executed by an Internet direct device associated with a user to cause the Internet direct device to:
   automatically connect the Internet direct device to said communications network on power-up using one of a plurality of available modes of connection, which is designated as a primary mode of connection;
   capture still or video images by an image capture system of the Internet direct device;

transmit the captured still or video images to another Internet direct device over said communications network upon image capture by a microprocessor of the Internet direct device;

receive still or video images from said other Internet direct device over said communications network by the Internet direct device; and automatically switch to another available mode of connection by the microprocessor when the Internet direct device detects that said primary mode of connection to the communications network is unavailable.

33. The storage medium of claim 32, the program when executed causes the Internet direct device to automatically switch to one of the following available modes of connection: a land line, DSL, cable, satellite, wireless network, cellular, Wi-Fi, and Wi-Max.

34. The storage medium of claim 32, the program when executed causes the Internet direct device to locally store the captured still or video images in a storage device when the connection to said communications network is unavailable.

35. The storage medium of claim 32, the program when executed causes the Internet direct device to transmit and receive audio to and from said other Internet direct devices over said communications network.

36. The storage medium of claim 32, the program when executed causes the Internet direct device to communicate with other Internet direct devices over said communications network.

37. The storage medium of claim 32, the program when executed causes the Internet direct device to communicate with other Internet direct devices via voice over IP by the Internet direct device associated with the user.

38. The storage medium of claim 32, the program when executed causes the Internet direct device to display the still or video images on a display and receive texts from the user.

39. The storage medium of claim 32, the program when executed causes the Internet direct device to access the Internet using a web browser over said communications network.

40. The storage medium of claim 32, the program when executed causes the Internet direct device to download live or recorded audio or video images from a website over said communications network.

* * * * *